UNITED STATES PATENT OFFICE.

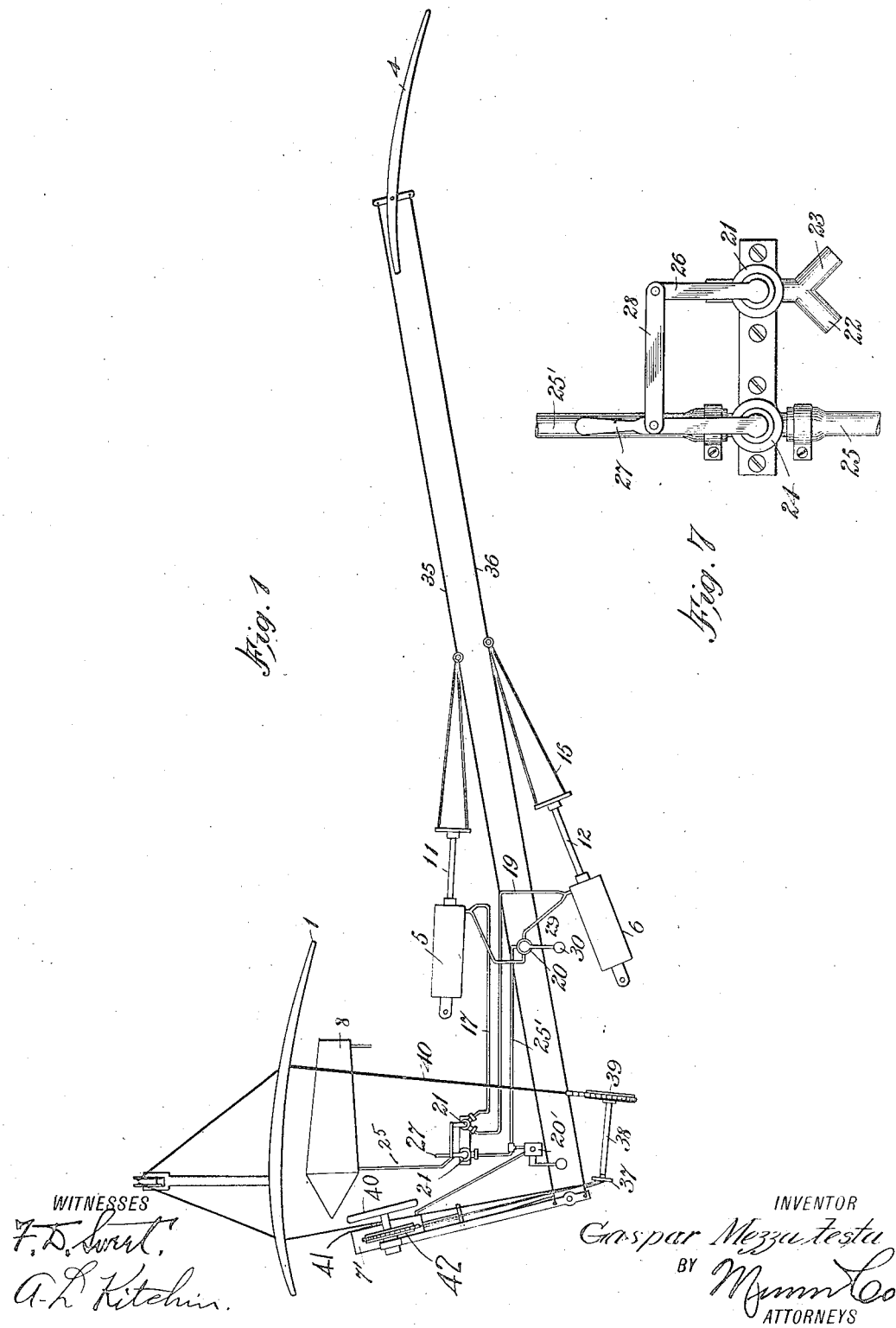

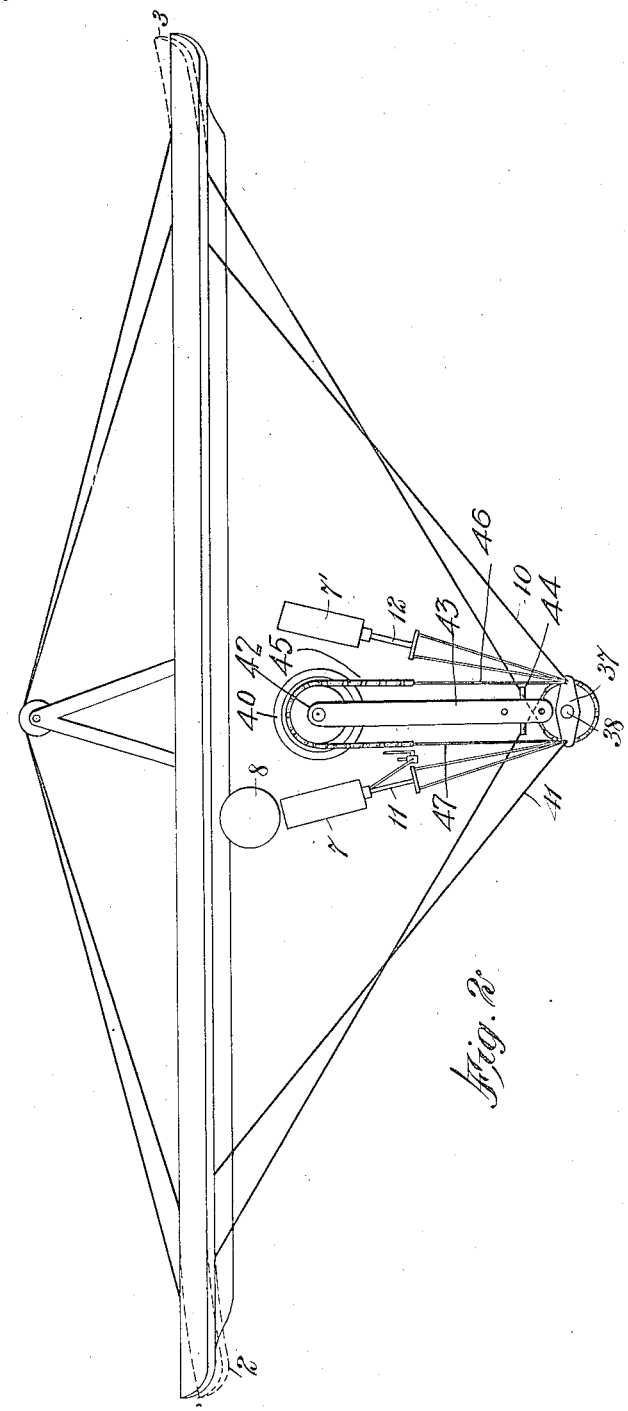

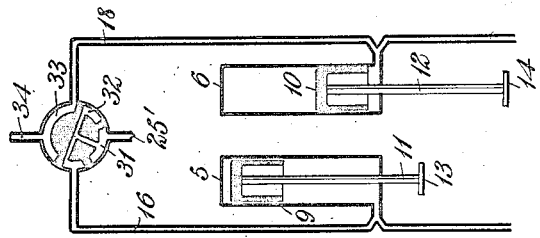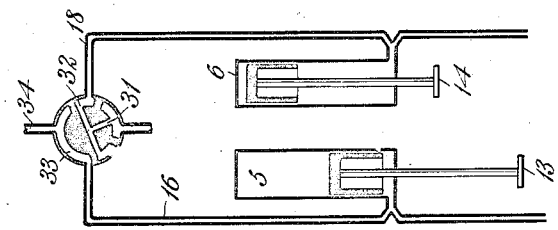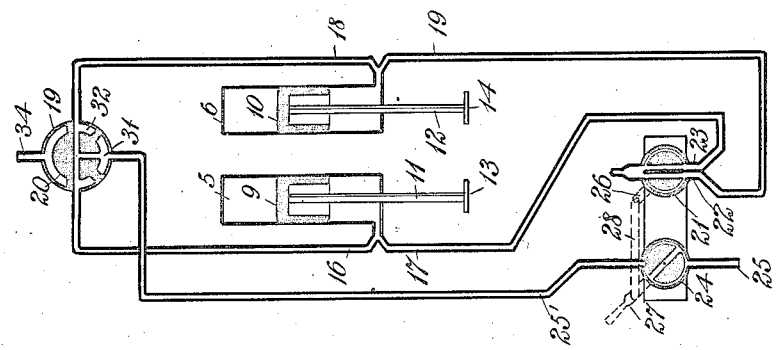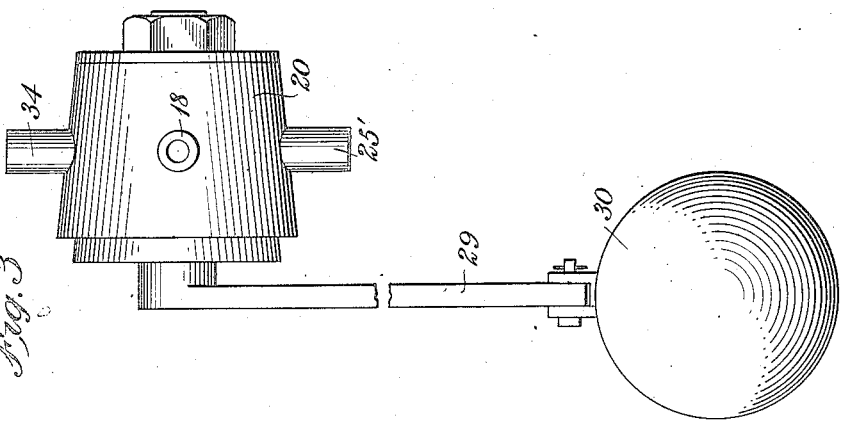

GASPAR MEZZATESTA, OF NEW YORK, N. Y.

AEROPLANE-BALANCE.

1,140,180.   Specification of Letters Patent.   Patented May 18, 1915.

Application filed October 6, 1913. Serial No. 793,641.

*To all whom it may concern:*

Be it known that I, GASPAR MEZZATESTA, a subject of the King of Italy, and a resident of the city of New York, borough of Manhattan, county and State of New York, have invented a new and Improved Aeroplane-Balance, of which the following is a full, clear, and exact description.

This invention relates to improvements in aeroplanes, and particularly to means for balancing the aeroplane automatically.

The object in view is to provide an improved structure which may be easily thrown into operation and out of operation, and when in operation to automatically maintain the aeroplane in the course being followed.

Another object of the invention is to provide a controlling device for the balancing members of the aeroplane and the elevation plane, which includes air controlled pistons for operating the balancing members and rudder, which pistons are in turn controlled by a gravity actuated valve so that when the aeroplane tilts or pitches the air pressure will be varied, and the pistons will operate for automatically shifting the position of the balancing planes or of the rudder.

A still further object of the invention is to provide pressure operated means for controlling the various movable planes, the pressure operated means being automatically set in motion by a gravity actuated valve so that any movement out of the straight course will cause a readjustment of the planes.

In carrying out the object of the invention it is designed to apply the device to any desired form of aeroplane so as to operate the balancing members, and also the elevation members thereof automatically. In arranging the device in position means are provided for switching on and off the device so that when switched off the aeroplane may be operated manually in the usual manner of that particular make, but when the device is switched on the same automatically controls the balancing device of the aeroplane as well as the steering features so as to maintain the aeroplane in its original course, and to return it to said course when moved therefrom by any particular action of the atmosphere. In arranging the device formed according to the present invention on an aeroplane, connecting members of any desired kind are connected with the rudder, and with the balancing planes, and also with movable members, which in turn are connected with the pistons of the automatic balancing device. These pistons are arranged in suitable cylinders, and are operated by fluid pressure, as for instance compressed air, so that when the aeroplane is moving along in a proper horizontal position the pistons will be stationary, but if the aeroplane should pitch or tilt to one side the cylinder affected would be supplied with air so as to operate the proper plane. A gravity actuated valve is provided for the cylinders controlling the tilting planes or balancing planes, and a second gravity actuated valve is provided for the rudder or steering plane at the rear so that the same may be operated when the aeroplane pitches.

In the accompanying drawings—Figure 1 is a side view of an aeroplane in diagram, an embodiment of the invention being shown applied thereto; Fig. 2 is a front view of the structure shown in Fig. 1; Fig. 3 is an enlarged side view of one of the gravity actuated valves; Fig. 4 is a diagram showing the arrangement of the pistons, valves and associated parts for automatically shifting the position of the planes; Fig. 5 is a diagram showing the upper part of the structure disclosed in Fig. 4, the valve being shown tilted in one direction; Fig. 6 is a view similar to Fig. 5 except that the valve is shown tilted in the opposite direction; Fig. 7 is an enlarged detailed fragmentary plan view of the mechanism for throwing in and out the automatic controlling devices.

Referring to the accompanying drawings by numeral 1 indicates an aeroplane of any desired kind which is provided with balancing planes 2 and 3 of any desired kind, the particular structure of the aeroplane and the balancing planes not forming any part of the present invention. The aeroplane is also provided with a rear steering plane 4. In the ordinary manipulation the planes 2, 3 and 4 are actuated by the operator for causing the aeroplane to move up or down, or from one side to the other. Also, these planes are moved by the operator for properly balancing and directing the aeroplane in a straight course. The automatic means forming the present invention is designed to cause the aeroplane to move in a straight line after having been started on such a course so that the operator need not pay any attention to the balancing or steering of the aeroplane when he desires only to move in a direct line. In order to do this any tilting or pitching of the aeroplane must be resisted and the various planes 2, 3 and 4 must be adjusted upon each movement of the aeroplane to bring the aeroplane back to its original course. In accomplishing this result cylinders 5 and 6 are provided for plane 4 and cylinders 7 and 7′ provided for the planes 2 and 3. These cylinders are designed to receive air pressure or any desired pressure from tank 8, and through proper mechanism hereinafter fully described to automatically elevate or depress the respective planes just mentioned when the equilibrium of the aeroplane has been disturbed. The cylinders are made alike, and cylinders 5 and 6 are similar to cylinders 7 and 7′ but arranged to control the rear plane 4 instead of the side planes 2 and 3. In Figs. 4, 5 and 6 a diagram of the structure of these cylinders and how they operate is disclosed. Referring in detail to these figures it will be observed that the cylinders 5 and 6 carry pistons 9 and 10 which are provided with piston rods 11 and 12 having cross bars 13 and 14. Connected with the cross bars 13 and 14 are cables or other power transmitting members 15. The power transmitting members 15 are connected with the usual plane controlling cables so that when the pistons are operated, the regular cables are also operated for varying the position of the respective planes. Connected with the lower end of cylinder 5 are pipes 16 and 17, while connected with the lower end of cylinder 6 are pipes 18 and 19. Pipes 16 and 18 extend upwardly and are connected with housing 19 of valve 20. Pipes 17 and 19 extend to a manually controlled valve 21 having passageways 22 and 23 extending therethrough so that a single valve 21 may open or close both of the pipes 17 and 19. Associated with valve 21 is valve 24 interposed in pipe 25. Valves 21 and 24 are provided with operating levers 26 and 27, and with a connecting link 28, whereby when lever 27 is actuated both of the valves will be moved. The tank 8 containing the compressed air is continually in communication with pipe 25, and when valve 24 is opened air is supplied to pipe 25′, which air passes upwardly to valve 20. When the planes are in their normal position the valve 20 will be in the position shown in Fig. 4. If the aeroplane should tilt in one direction the valve 20 would move to the position shown in Fig. 5, and if tilted in the opposite direction would move to the position shown in Fig. 6. Valve 20 is provided with an operating arm or lever 29 which carries a weight 30. The weight 30 is of course acted upon by gravity, and will cause the lever or arm 29 to continually point toward the earth and thus move valve 20 as the aeroplane is tilted. As valve 20 is comparatively small and only a small power is needed for actuating the same weight 30 is comparatively small and weighs preferably only a few pounds. When the valve 20 moves from the position shown in Fig. 4 to that shown in Fig. 5 air passes from pipe 25′ into valve 20 and through passageway 31 to passageway 32, and from passageway 32 into pipe 18. From pipe 18 the air passes into cylinder 6 and moves piston 10 upwardly from cable pulling members 15. Simultaneously with the admission of compressed air into cylinder 6 the compressed air in cylinder 5 will be exhausted through pipe 16, passageway 33 and exhaust pipe 34. In case the aeroplane should tilt to the opposite position valve 20 will assume the position shown in Fig. 6 and the pistons will make a reverse movement, as shown in Fig. 6. It is of course understood that valve 21 is closed when valve 24 is opened so that the pressure passing from valve 20 cannot escape until after it has entered the respective cylinders, and even then cannot escape until the valve has been tilted, as shown in Figs. 5 and 6. This valve 20 is arranged to control the pressure in cylinders 5 and 6, and a valve 20′ similar to valve 20 is arranged to control the pressure in the cylinders 7 and 7′. The valves 20 and 20′ are identical in structure, but are set so as to operate differently, namely, valve 20 is designed to swing freely from front to rear in case the aeroplane should pitch, but will not move in case the aeroplane should toss or tilt sidewise. However, valve 20′ is arranged to move freely laterally in a pivotal direction so as to swing when the aeroplane tosses or tilts sidewise. In this way the respective valve will properly operate the correct planes when the aeroplane moves incorrectly.

When the automatic balancing devices are in operation valves 21 and 24 are set as shown in Fig. 7. However, in case it should be desired to operate the various planes independently of the automatic means, the automatic means may be switched off by merely operating lever 27 so as to prevent passage of air from pipe 25 to 25′; and to allow the free escape of air from pipes 17 and 18. In order to accomplish this result when valve 21 is open and valve 24 closed, as shown in Fig. 4, the pressure is exhausted from the cylinders through pipes 17 and 19, and valve 21, so that manual operation of the stabilizers is not resisted by the pistons 9 and 10.

The connecting members 15 associated with the cylinders 5 and 6 are connected to the rudder manipulating cables 35 and 36 (Fig. 1). It will be observed that when bar 13 is pulled plane 4 will be moved in one direction, and when bar 14 is pulled plane 4 will be moved in the opposite direction so as to cause the aeroplane to rise or descend. When either of the cylinders 7 or 7' is operated the bar 37 (Fig. 2) is moved, and bar 37 is rigidly secured to shaft 38, which shaft carries a sprocket wheel 39 over which the controlling members 40 and 41 are passed. As the sprocket wheel 39 is moved one way or the other the planes 2 and 3 will be tilted. It is of course evident that other connecting means could be provided for the pistons in cylinders 7 and 7' without departing from the spirit of the invention provided the movement of the pistons is properly communicated to the side balancing planes. The side balancing planes may be part of the main plane and be warped, or may be separate members, and tilted when manipulating the aeroplane, the detailed structure of these planes and the means for actuating the same not forming any part of the invention. It is therefore to be noted that applicant's device resides in the automatic means which operates the controlling members on an aeroplane, which automatic means may be at any time thrown into operation or thrown out of operation by a movement of the lever 27. When the aeroplane tilts sidewise the valve 20' will be moved by its pendulum or weight 30, and lever 29, so as to admit pressure into one of the cylinders 7 or 7', and exhaust pressure from the opposite cylinder so that one of the planes or both planes 2 and 3 may be operated for bringing the aeroplane back to a horizontal position. When the aeroplane again reaches a horizontal position the air is again admitted into both cylinders so that the same are evenly balanced. When the aeroplane pitches or attempts to go up or down at an angle valve 20 is moved and bars 13 and 14 associated with the cylinders 5 and 6 are actuated for properly manipulating plane 4.

It will be observed from the way the air under pressure is admitted to the various cylinders that the pistons thereof automatically move whenever the aeroplane is out of its ordinary horizontal position. As soon as the aeroplane assumes its horizontal position the automatic means is balanced. As the automatic means holds the aeroplane in a straight course and continually in a horizontal position the same must be thrown out when it is desired to turn or to rise or descend. This may be easily done by moving lever 27 to the position shown in Fig. 4. The automatic means is then deprived of air under pressure and the various steering members of the aeroplane may be operated in the usual manner by the usual operating appliances. These appliances may be of any kind, as for instance a steering wheel 40 secured to a suitable shaft 41, which shaft carries a sprocket wheel 42. The shaft 41 is mounted upon a support 43 pivotally held in place by a suitable journal member 44 so that wheel 40 and associated parts may be swung rearwardly and forwardly at will for manually moving the cables 35 and 36 so as to vary the position of the plane 4. When it is designed to manipulate the balancing planes 2 and 3, wheel 40 is rotated or partially rotated in the desired direction, whereupon the chain 45 will be moved. The ends of chain 45 (Fig. 2) are connected with bar 37 through suitable cables 46 and 47 so that a rotary movement of the sprocket 42 will cause a corresponding movement of bar 37, whereupon the cables connecting the same with planes 2 and 3 will be moved. It is to be noted that the manually operated means are only actuated by the operator when the automatic control is turned out of operation.

What I claim is—

In an aeroplane balancing device, the combination of the usual balancing and steering planes of an aeroplane, of mechanism for actuating said planes, said mechanism comprising a pair of reciprocating members for the plane controlling the lateral balance of the aeroplane, a pair of reciprocating members for actuating the plane controlling the pitching of the aeroplane, means for supplying power to all of said reciprocating members, a pair of gravity actuated power controlling members for turning on and off the power as the aeroplane tosses or pitches, and manually controlled means for disconnecting the power from all of said reciprocating members, said manually controlled means comprising a pair of valves, a connection between said valves for causing the same to act simultaneously, whereby one is closed as the other is opened, and means for moving said connection.

In testimony whereof I have signed my name to this specification in the presence of two subscribing witnesses.

GASPAR MEZZATESTA.

Witnesses:
A. L. KITCHIN,
PHILIP D. ROLLHAUS.